US006863046B2

(12) United States Patent
Laimböck

(10) Patent No.: US 6,863,046 B2
(45) Date of Patent: Mar. 8, 2005

(54) INTERNAL COMBUSTION ENGINE COMPRISING AT LEAST TWO INLET VALVES PER CYLINDER

(75) Inventor: Franz Laimböck, Thal (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/484,952

(22) PCT Filed: Aug. 1, 2002

(86) PCT No.: PCT/AT02/00231

§ 371 (c)(1),
(2), (4) Date: Jan. 28, 2004

(87) PCT Pub. No.: WO03/012268

PCT Pub. Date: Feb. 13, 2003

(65) Prior Publication Data

US 2004/0216716 A1 Nov. 4, 2004

(30) Foreign Application Priority Data

Aug. 2, 2001 (AT) ...................... GM611/2001

(51) Int. Cl.[7] .............................................. F02B 31/06
(52) U.S. Cl. ....................... 123/308; 123/302; 123/442; 123/590
(58) Field of Search ................ 123/298, 301, 123/302, 306, 308, 336, 442, 590, 592, 593

(56) References Cited

U.S. PATENT DOCUMENTS

| 3,087,367 | A | * | 4/1963 | Semler | ......................... 83/588 |
| 4,548,175 | A | | 10/1985 | Kawai et al. | |
| 4,719,886 | A | | 1/1988 | Kotani et al. | |
| 5,007,402 | A | * | 4/1991 | Scherenberg | ................ 123/549 |
| 5,273,014 | A | * | 12/1993 | Mitobe et al. | ............... 123/336 |
| 5,323,753 | A | * | 6/1994 | Cikanek et al. | ............. 123/593 |
| 5,417,190 | A | * | 5/1995 | Ando et al. | .................. 123/308 |

(List continued on next page.)

FOREIGN PATENT DOCUMENTS

| AT | 402535 | 6/1997 |
| AT | 2434 | 10/1998 |
| AT | 3138 | 10/1999 |
| DE | 3836550 | 5/1990 |
| EP | 0764773 | 3/1997 |

OTHER PUBLICATIONS

Patent Abstracts of Japan, vol. 009, No. 100 (M–376), May 2, 1985 of JP 59 224466 of Inone Tokuta, entitled "Intake Device for Internal–Combustion Engine".

(List continued on next page.)

*Primary Examiner*—Hai Huynh
(74) *Attorney, Agent, or Firm*—Dykema Gossett PLLC

(57) ABSTRACT

An internal combustion engine includes at least two intake valves per cylinder, and at least two intake ports leading to the intake valves, a first intake port preferably being configured as unthrottled tangential passage and the flow through a second intake port being controlled by means of a first throttle element (11) actuated in dependence of at least one engine parameter, and at least one fuel injector per cylinder injecting fuel into at least two intake ports, wherein in the closed position of the first throttle element at least one leakage aperture will permit a defined minimum flow through the second intake port. To improve emission values of the engine in a simple manner, the first throttle element is positioned downstream of the fuel injector and that at least one leakage aperture is provided in the area impinged on by at least one injection jet, the first throttle element in its closed position forming an obtuse angle ($\alpha$) of greater than 90° with a partition wall between the first and second intake port so that the inlet air flow will be diverted towards the first intake port.

14 Claims, 1 Drawing Sheet

U.S. PATENT DOCUMENTS

| | | | | |
|---|---|---|---|---|
| 5,477,823 A | * | 12/1995 | Uchida | 123/308 |
| 5,551,392 A | * | 9/1996 | Yamaji et al. | 123/306 |
| 5,632,244 A | * | 5/1997 | Endres et al. | 123/306 |
| 5,813,388 A | * | 9/1998 | Cikanek, Jr. et al. | 123/549 |
| 5,819,706 A | * | 10/1998 | Tsuchida et al. | 123/432 |
| 6,067,971 A | * | 5/2000 | Cikanek et al. | 123/549 |
| 6,148,794 A | * | 11/2000 | Tsuzuku et al. | 123/406.5 |
| 6,196,186 B1 | * | 3/2001 | Nagasaka et al. | 123/336 |
| 6,394,066 B1 | * | 5/2002 | Chou et al. | 123/308 |
| 6,484,690 B2 | * | 11/2002 | Tokuyasu et al. | 123/301 |
| 6,575,133 B2 | * | 6/2003 | Ries-Mueller et al. | 123/306 |
| 6,615,789 B2 | * | 9/2003 | Inoue et al. | 123/193.6 |
| 6,634,333 B2 | * | 10/2003 | Fujieda et al. | 123/308 |
| 6,705,280 B1 | * | 3/2004 | Lippert | 123/306 |
| 6,722,344 B2 | * | 4/2004 | Ashida et al. | 123/432 |

OTHER PUBLICATIONS

Patent Abstracts of Japan, vol. 009, No. 307 (M–435), Dec. 4, 1985 of JP 60 142053 to Kanda Mutsumi, entitled "Suction Device of Multiple Suction Type Internal–Combustion Engine".

Patent Abstracts of Japan, vol. 018, No. 212 (M–1593), Apr. 15, 1994 of JP 06 010803 to Imashiro Minoru, entitled "Fuel Supply Device of Internal Combustion Engine".

Patent Abstracts of Japan, of JP 06 101602 to Imashiro Minoru, Apr. 12, 1994, entitled "Fuel Supply Device for Internal Combustion Engine".

* cited by examiner

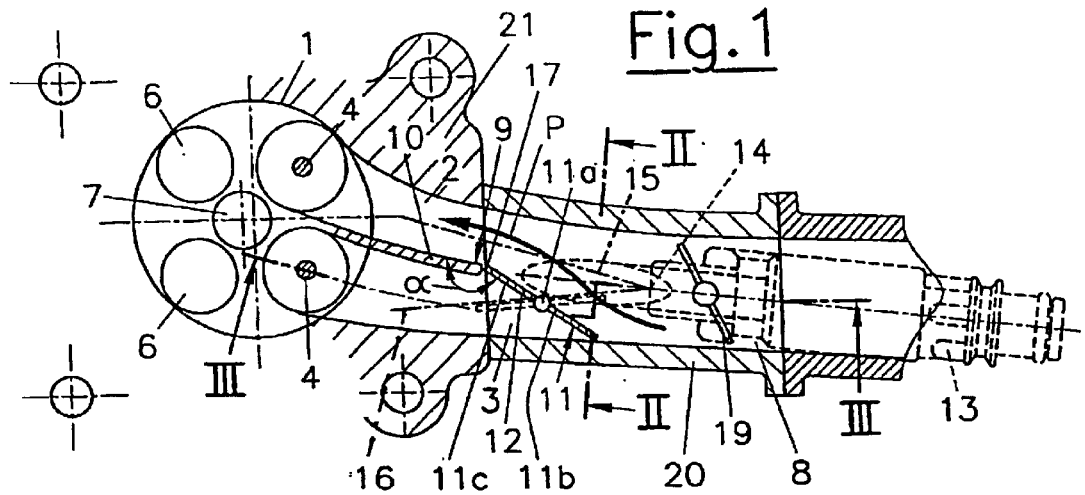
Fig.1
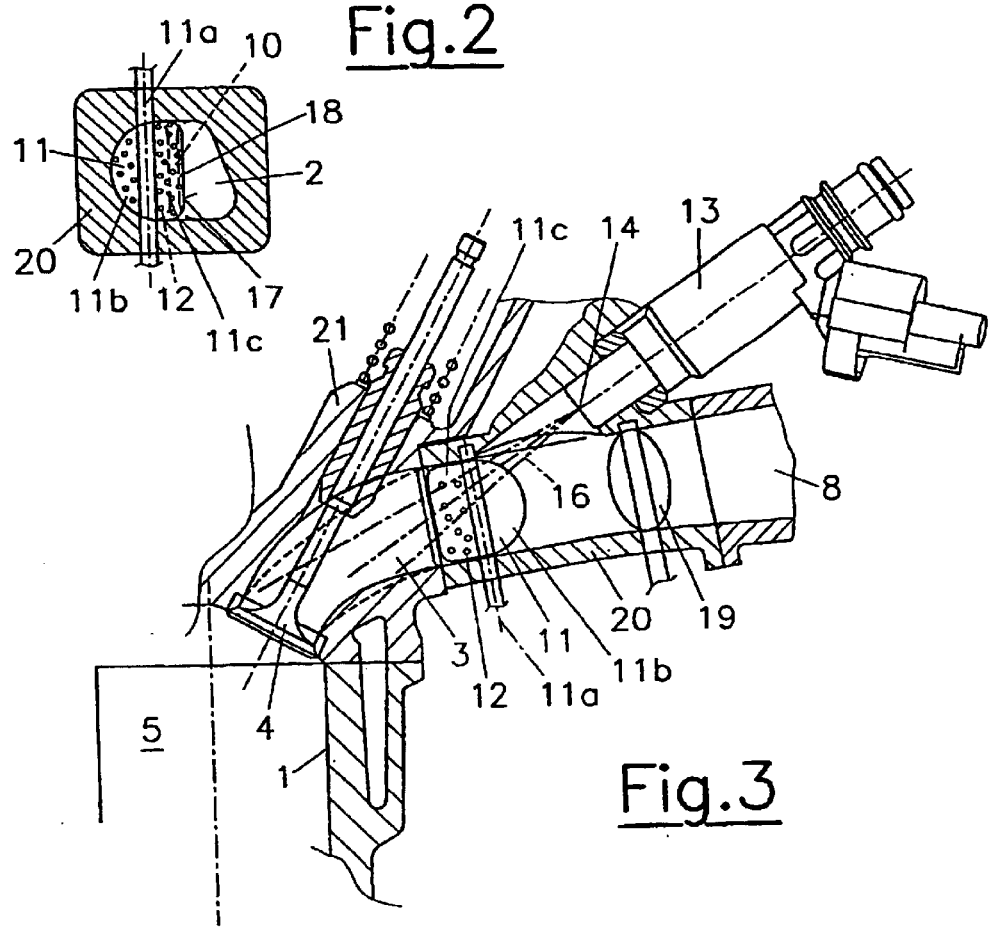
Fig.2
Fig.3

INTERNAL COMBUSTION ENGINE COMPRISING AT LEAST TWO INLET VALVES PER CYLINDER

The invention relates to an internal combustion engine with at least two intake valves per cylinder and at least two intake ports leading to the intake valves, a first of said intake ports preferably being configured as unthrottled tangential passage and the flow through a second intake port being controlled by means of a first throttle element actuated in dependence of at least one engine parameter, and at least one fuel injector per cylinder injecting fuel into at least two intake ports, wherein in the closed position of the first throttle element at least one leakage aperture will permit a defined minimum flow through the second intake port, and wherein the first throttle element is positioned downstream of the fuel injector and at least one leakage aperture is provided in the area impinged on by at least one injection jet, and wherein the first throttle element in its closed position forms an obtuse angle of greater than 90° with a partition wall between the first and second intake port, so that the intake flow will be diverted towards the first intake port.

In AT 402 535 B an internal combustion engine is disclosed in which the fuel is injected by an injection valve through an opening in the partition wall between two adjacent intake passages. The opening between these passages may induce crossflow, however, and result in deflection of the fuel jet injected, in particular, if recirculated exhaust gas or additional air is admitted into the tangential passage. In the extreme case the fuel stream intended for the tangential passage will be injected through the opening into the second intake port configured as neutral passage.

In order to prevent this undesirable activity the throttle element according to AT 2434 U1 is designed to permit a defined minimum flow of 5% to 20% in its closed position. In this way it is hoped that the fuel injected into the tangential passage will be kept in place and the two fuel jets will be prevented from wetting the walls of the intake passages with fuel.

According to EP 0 764 773 A1 a throttle element is provided in the neutral passage, which is designed to produce a defined minimum flow in its closed position and thus a stable radial mixture stratification, whose formation may be varied with the engine load. The defined leakage aperture may not entirely prevent deflection of the injected fuel and subsequent adherence to the exterior surface of the neutral passage, which will have negative effects on hydrocarbon emissions.

For an internal combustion engine with two intake ports it is further proposed in AT 3138 U1 that a leakage flow path formed by flow guiding faces and designed for minimum flow, should be provided in the area of the partition wall separating the two intake passages, i.e. between the throttle element and a defined opening in the said partition wall. The flow guiding faces are formed by inserting a guiding device of sheet metal into the second intake port. This will increase production cost, however.

An internal combustion engine with two intake ports is disclosed in JP 06-010803 A, where the intake ports depart from a common feeder passage. Downstream of a fuel injection device a swirl control valve is located in the feeder passage. The swirl control valve has a leakage aperture in the area of one of the intake ports, through which inlet air will be admitted into the intake port in the closed position of the valve. The leakage aperture will also permit injection of a fuel jet into the particular intake port. Next to the other intake port the swirl control valve has an injection orifice through which a fuel jet is directed into the other intake port. A similar internal combustion engine is described in JP 06-101602 A, where one half of a feeder passage leading towards two intake ports is closed by a swirl control valve. The injector nozzle is placed next to the swirl control valve. By means of an extended injection pipe fuel is delivered into the half of the feeder passage blocked by the swirl control valve. These arrangements are rather complex and will not reliably prevent deflection of the fuel jet. Moreover, high flow losses are encountered due to the closed swirl control valve.

An internal combustion engine with two intake valves per cylinder is disclosed in JP 59-224466 A, wherein an intake port leads to each of the intake valves. Flow through one of said intake ports may be controlled by a throttle element. This throttle element is positioned downstream of a fuel injection unit injecting fuel into both intake ports. The cross-section of the throttle element is smaller than the flow cross-section of the corresponding intake port in this area so that a minimum flow will be permitted even in the closed position of the throttle. The injection jet is directed at the free space between throttle element and port partition wall so that the fuel will be injected directly into the inlet openings without hitting the throttle element. Since the throttle element keeps a certain distance from the port partition wall even in its closed position, the effect of diverting the flow towards the first intake port will be relatively small. Deflection of the injected fuel and subsequent adherence to the partition wall cannot be excluded.

It is an object of the invention to improve emission values in an engine of the afore-mentioned type while avoiding the above disadvantages.

According to the invention this object is achieved by providing that the first and second intake ports depart from a common manifold, and that the first throttle element be located in the area where the two intake ports branch off from the manifold, preferably immediately upstream of the branching area. Due to the fact that the closed throttle flap forms an angle of >90° with the partition wall, flow losses may be kept very small. Preferably, the leakage aperture is formed by at least one bore in the first throttle element.

The fuel is injected into the second intake port through the leakage apertures of the first throttle element. Downstream of the first throttle element the first and second intake ports are configured as strictly separate passages. In this way no crossflow diverting the fuel jet will be encountered downstream of the first throttle element. For feeding the fuel into the second intake port it will suffice if the leakage apertures are positioned, at least predominantly, in the half of the first throttle element wetted by the fuel jet.

To control the inlet flow into the cylinder the manifold is provided with a second throttle element, preferably configured as a flap, which is positioned upstream of the nozzle of the injector.

In order to keep flow losses as small as possible when the first throttle element is closed, it will be of advantage if the cross-section of the throttle flap exceeds the cross-section of the second intake port. Advantageously, the first throttle element is configured as a flap, and the rotation axis of the first throttle element is located upstream of the branching.

When fuel is injected through the closed throttle flap by directing the fuel jet onto the leakage apertures of the first throttle element, a fuel film may be deposited on the surface of the first throttle element. To remove this film adhering to the first throttle element the latter should preferably be provided with a separator edge projecting into the first intake port in the closed position of the throttle flap. The fuel film will be swept along with the inlet flow passing along the surface of the flap and will reach the cylinder via the first intake port.

In order to keep the first throttle element rotationally neutral, its flap areas on either side of the rotation axis should be designed so as to have the same air resistance.

A simple way of controlling the inlet flow is achieved by coupling the first and second throttle element in at least one operating range.

In a particularly preferred variant of the invention, which is characterized by special ease of assembly and maintenance, the proposal is put forward that the first and second throttle element and preferably also the fuel injector should be provided in a common adapter piece.

Following is a more detailed description of the invention with reference to the enclosed drawings, wherein FIG. 1 shows an intake port configuration for an internal combustion engine according to the invention, FIG. 2 shows the intake port configuration in a section along line II—II in FIG. 1, FIG. 3 shows the internal combustion engine in a section along line III—III in FIG. 1.

Each cylinder 1 of the internal combustion engine has a first intake port 2 and a second intake port 3, both of which lead to an intake valve 4 opening into a combustion chamber 5. On the side of the cylinder 1 opposite of the intake valves 4 exhaust valves 6 are provided. In the centre of the cylinder 1 a spark plug 7 is provided.

The first intake port 2 is configured as a tangential passage, while the second intake port 3 is a neutral passage. Both intake ports 2, 3 depart from a common manifold 8. Starting at a branching area 9 the two ports 2, 3 are separated by a partition wall 10.

For control of the intake flow a throttle element 11 configured as a flap is provided in the flow path towards the second intake port 3, which throttle element 11 may be rotated between an open position and a closed position. The open position is indicated by broken lines in FIG. 1. In order to keep the element rotationally neutral the flap areas 11b, 11c on either side of the rotation axis 11a are designed such that they offer the same air resistance relative to the intake flow.

The first throttle element 11, i.e. at least the part facing the partition wall 10, has several leakage apertures 12 formed by bores of predefined cross-section, in order to permit a precisely defined leakage flow through the second intake port 3 in the closed position indicated by full lines in FIG. 1. Upstream of the first throttle element 11 a fuel injector 13 opens into the manifold 8, whose nozzle is referred to as 14. By means of the fuel injector 13 fuel is injected into the two intake ports 2, 3. The fuel jets of the first and second intake ports 2, 3 bear reference numerals 15, 16. In the closed position of the first throttle element 11 the fuel jets 16 designed for the second intake port 3 are directed onto the leakage apertures 12, permitting the fuel to be injected into the second intake port 3 through the closed first throttle element 11.

The first throttle element 11 is larger than the cross-section of the second intake port 3. The rotation axis 11a of the first throttle element 11 is positioned upstream of the branching area 9, so that the first throttle element 11 in its closed position will form an obtuse angle α>90° with the partition wall 10. This will permit the intake flow to be diverted into the first intake port 2 without appreciable loss, as is indicated by arrow P in FIG. 1.

Fuel injection through the leakage apertures 12 may result in the formation of a fuel film on the surface of the first throttle element 11. This fuel will be added to the intake flow by providing the first throttle element 11 with a separator edge 17 slightly projecting into the first intake port 2 in the closed position of the throttle, so that the fuel droplets will detach themselves from the surface and will be passed on to the intake flow in the first intake port 2 (FIG. 2). In this way formation of a fuel film on the wall of the partition 10 is prevented. The projecting part of the first throttle element 11 is referred to as 18.

Upstream of the nozzle 14 of the fuel injector 13 a second throttle element 19 formed by a flap is provided for control of the overall admission rate of inlet air in accordance with the engine load.

The first throttle element 11 and the second throttle element 19 are provided in a common adapter piece 20, which is flange-mounted on the cylinder head 21 and will also hold the fuel injector 13.

What is claimed is:

1. An internal combustion engine with at least two intake valves per cylinder, and at least two intake ports leading to the intake valves, a first intake port being configured as tangential passage and the flow through a second intake port being controlled by means of a first throttle element actuated in dependence of at least one engine parameter, and at least one fuel injector per cylinder injecting fuel into at least two intake ports, wherein in the closed position of the first throttle element at least one leakage aperture will permit a defined minimum flow through the second intake port, and wherein the first throttle element is positioned downstream of the fuel injector and at least one leakage aperture is provided in an area impinged on by at least one injection jet, and wherein the first throttle element in its closed position forms an obtuse angle of greater than 90° with a partition wall between the first and second intake port, so that the intake flow will be diverted towards the first intake port, wherein the first and second intake ports depart from a common manifold, and that the first throttle element is located in the branching area where the two intake ports branch off from the manifold.

2. The internal combustion engine according to claim 1, wherein the first intake part is configured as an unthrottled passage.

3. The internal combustion engine according to claim 1, wherein the first throttle element is located immediately upstream of the branching area.

4. The internal combustion engine according to claim 1, wherein the leakage aperture is formed by at least one bore in the first throttle element.

5. The internal combustion engine according to claim 1, wherein the leakage apertures are positioned, at least predominantly, in half of the first throttle element wetted by the fuel jet.

6. The internal combustion engine according to claim 1, wherein the cross-section of the first throttle element exceeds the cross-section of the second intake port.

7. The internal combustion engine according to claim 1, wherein the first throttle element is provided with a separator edge projecting into the first intake port in a closed position of the first throttle element.

8. The internal combustion engine according to claim 1, wherein the first throttle element is configured as a flap and wherein a rotation axis of the first throttle element is located upstream of the branching area.

9. The internal combustion engine according to claim 1, wherein the manifold is provided with a second throttle element, which is positioned upstream of the fuel injector.

10. The internal combustion engine according to claim 9, wherein the second throttle element is configured as a flap.

11. The internal combustion engine according to claim 9, wherein the first and second throttle element are coupled.

12. The internal combustion engine according to claim 9, wherein the first and second throttle element are provided in a common adapter piece.

13. The internal combustion engine according to claim 12, wherein also the fuel injector is provided in a common adapter piece.

14. The internal combustion engine according to claim 1, wherein flap areas of the first throttle element on either side of a rotation axis are designed so as to have the same air resistance.

* * * * *